July 4, 1961

W. R. MILNER 2,991,110

SECTIONAL BUMPER AND SUPPORT STRUCTURE

Filed Sept. 29, 1954

INVENTOR
*Wilfred R. Milner*
BY
*L. D. Buell*
ATTORNEY

United States Patent Office 2,991,110
Patented July 4, 1961

2,991,110
SECTIONAL BUMPER AND SUPPORT STRUCTURE
Wilfred R. Milner, Franklin, Mich., assignor to General Motors Corporation, Detroit, Mich., a corporation of Delaware
Filed Sept. 29, 1954, Ser. No. 459,109
6 Claims. (Cl. 293—69)

This invention relates to bumper members in general and more particularly to bumper members for use with automotive and other vehicles.

Vehicle bumper members are principally used to protect vehicle bodies against damage but are also designed to include certain decorative features adding to the attractiveness of the vehicle with which employed. Manufacturers of motor vehicles are desirous of including both of such features in a bumper structure which is at the same time low in cost, easily manufactured, and readily assembled. Massive bumpers afford considerable protection but are expensive. Accessory guards and extension members which may be added to inadequate bumper members are also costly. Simplicity and proper structural design offer an answer to the whole problem.

It is now proposed to provide an attractive and sturdy bumper structure including spaced bumper members wrapping each fender and having an intermediate bridging impact member disposed therebetween. The bumper structure is made of separate members which are joined together when assembled to a vehicle. Such an assemblage is easier to handle, stock, and ship than previous elongated bumper members. The assembled parts of the proposed bumper structure, their manner of securement and relative disposition provide a simple, inexpensive and attractive bumper which is highly protective.

In addition to the aforementioned features of the proposed bumper structure, further utility is provided in including means for shielding and illuminating vehicle identification or license plates. Generally license plates are secured to the trunk lid or bumper of a vehicle and are obscured in foul weather by snow, sleet, mud and the like. Means used to illuminate such plates are similarly obscured. It is now intended to incorporate license plate illuminating means within the bridging member of the proposed bumper structure and to dispose the identification plate within the shielded protection of such structure. The illuminating means are protected against damage and are so disposed as to be practically unobstructable while the license plate itself is protected from damage and is disposed in a manner to assure greater visibility thereof.

Figure 1:
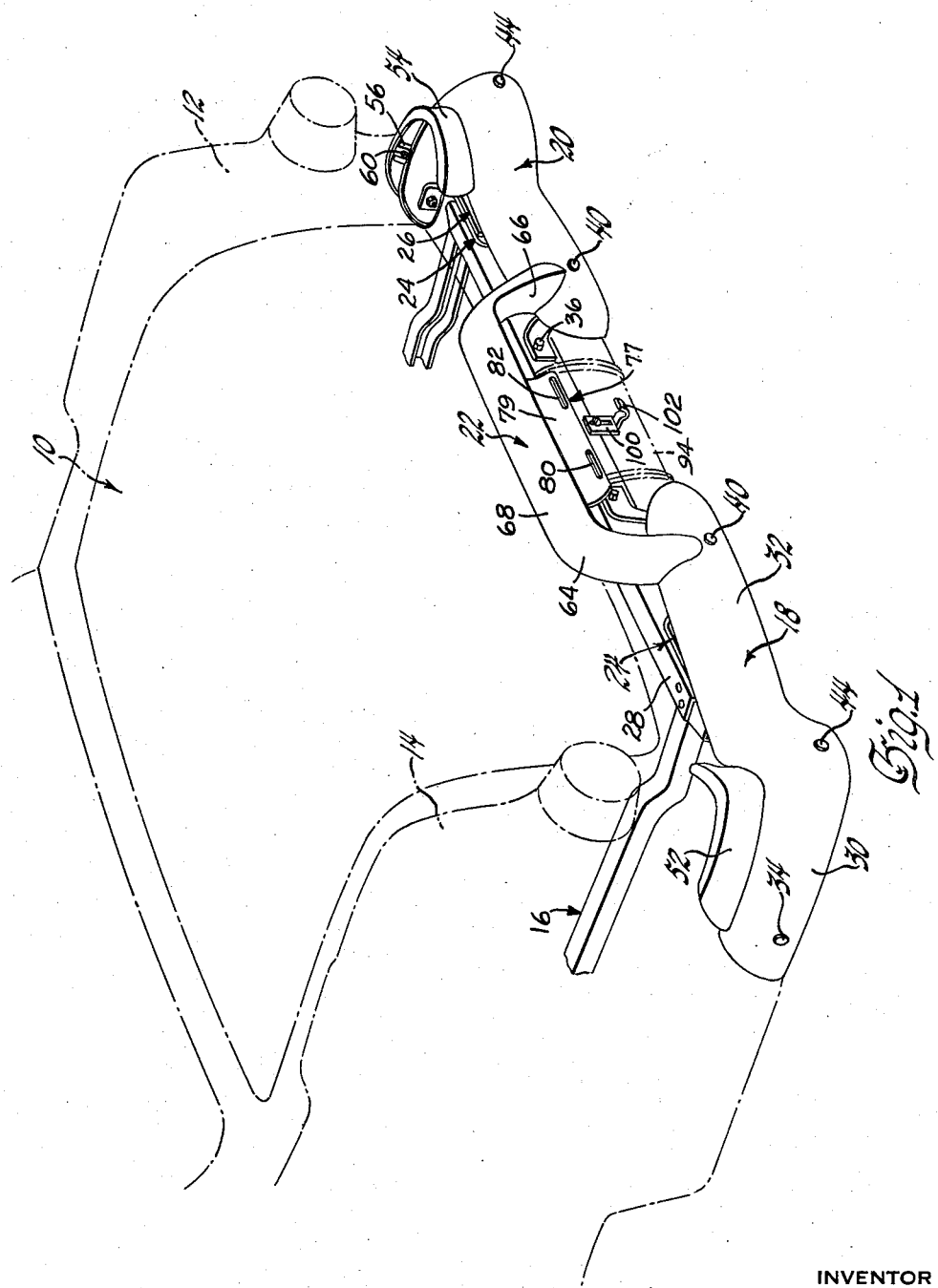
FIGURE 1 is a perspective view of the proposed bumper structure as used to protect the rear portion of a motor vehicle.
Figure 2:
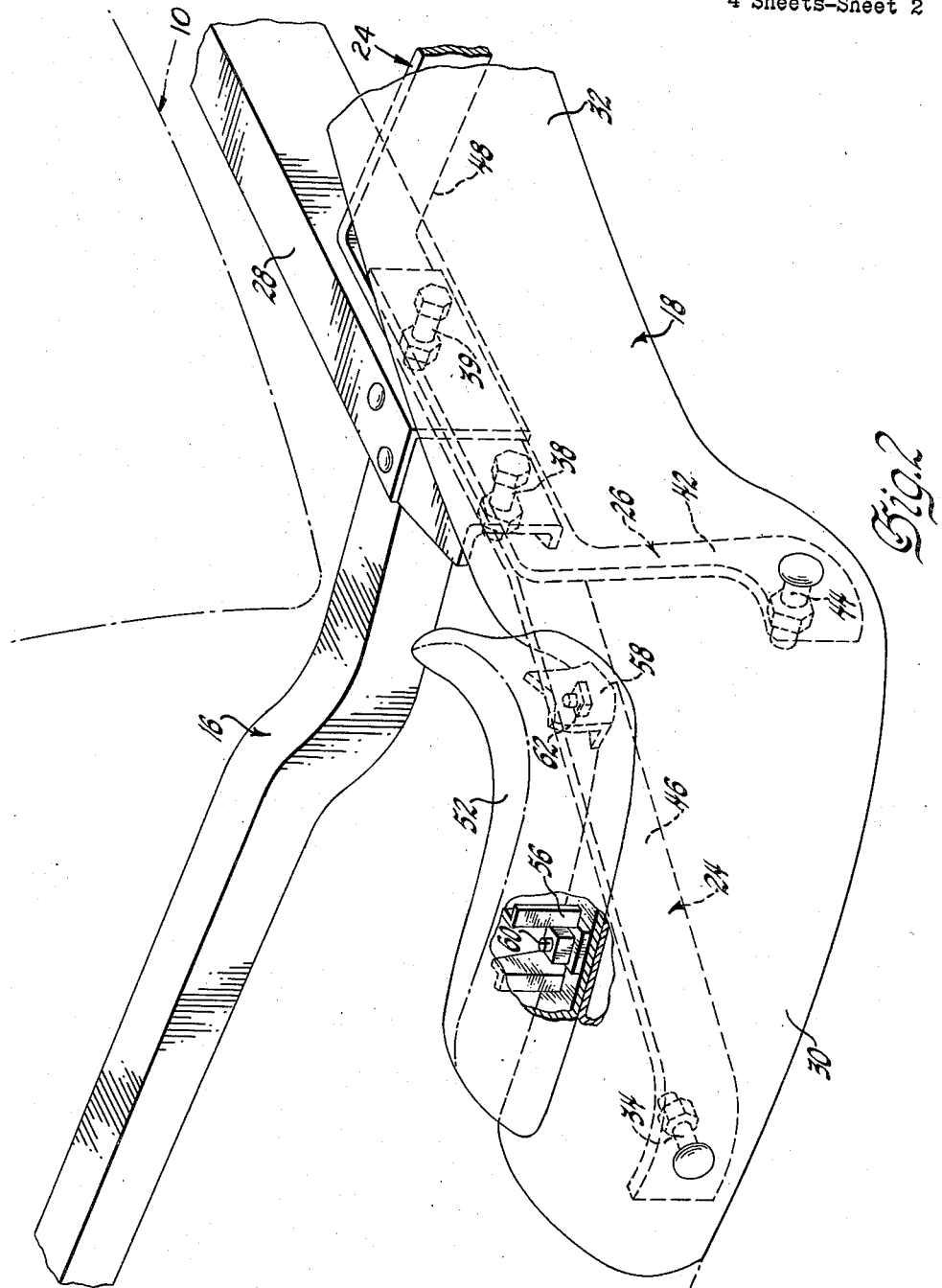
FIGURE 2 is an enlarged perspective view of a portion of the bumper structure shown in FIGURE 1 providing more structural details.
Figure 3:
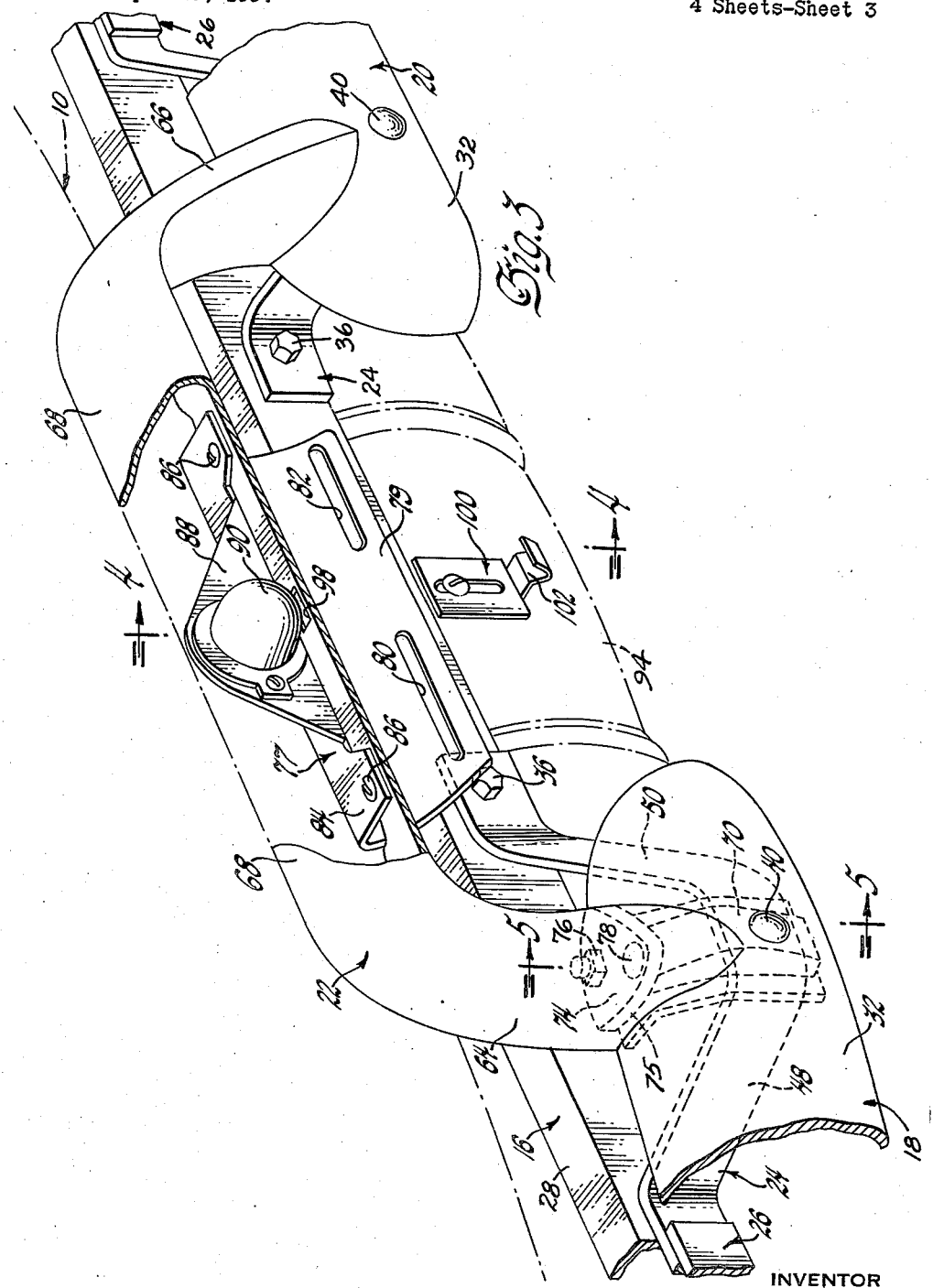
FIGURE 3 is an enlarged perspective view of the central portion of the proposed bumper structure shown in FIGURE 1 having parts broken away to more clearly show further details.
Figure 4:
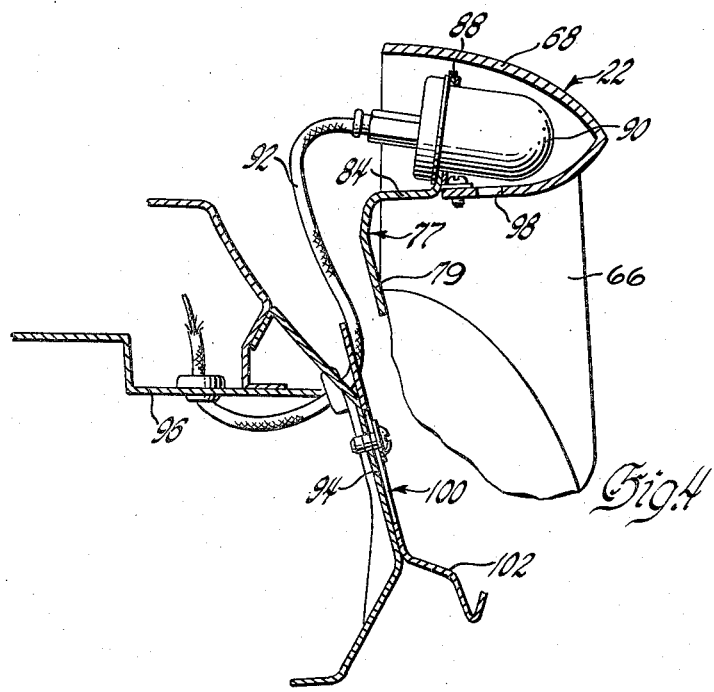
FIGURE 4 is a cross-sectional side view of the bumper structure including the license plate protective and illuminating means and as taken substantially in the plane of line 4—4 of FIGURE 3 and looking in the direction of the arrows thereon.
Figure 5:
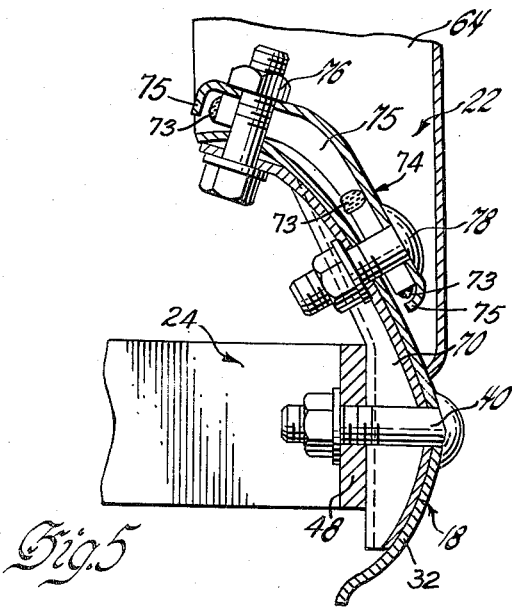
FIGURE 5 is a cross-sectional side view of the bumper structure taken substantially in the plane of line 5—5 of FIGURE 3 and looking in the direction of the arrows thereon.

The bumper structure here described is one which is disposed at the rear end of a vehicle body 10 and is adapted to wrap around the fenders 12 and 14 thereof. The bumper structure is secured to a vehicle frame 16 and includes separate quarter bumper members 18 and 20 which are joined by a bridging impact member 22 extended therebetween.

The quarter bumpers 18 and 20 are secured by bumper straps or braces 24 and 26 to the rear cross brace 28 of the vehicle frame 16. The bumper members 18 and 20 each include a wrap-around portion 30 skirting one of the vehicle fenders 12 or 14 and an extended portion 32 covering a part of the rear of the vehicle body 10. The ends of the respective extended portions 32 extend towards each other in aligned spaced relation from opposite corners of the vehicle. The bumper members 18 and 20 are rigidly supported by the bumper straps 24 and 26 in fixed spaced relation to the vehicle body 10 and frame 16. The one strap 24 has one of its ends secured to the wrap-around portion 30 of one of the bumper members 12 or 14 as at 34 and the other end secured to the frame cross member 28 as at 36 with the intermediate portion near the first mentioned end secured to the cross member 28 as at 38 and 39 and the intermediate portion near the other end secured to the extended portion 32 of the bumper member as at 40. The other bumper strap 26 is secured to the vehicle frame 16 with the strap 24 as at 38 and 39 and includes a support or brace arm 42 having its end secured to the intermediate portion of the bumper member between the wrap-around portion 30 and extended portion 32 as is shown at 44. Such securement is also between the securement points 34 and 40 of the strap 24 with the bumper member.

The bumper strap 24 thus includes a support arm 46 which, with brace arm 42 of strap 26, rigidly supports the wrap-around portion 30 of the bumper member in fixed spaced relation to the vehicle frame 16 and body 10. At the same time the bumper strap 24 includes bracing arms 48 and 50 which hold the extended portion 32 of the bumper member in similar fixed spaced relation to the vehicle frame 16 and body 10.

Additional protection may be provided for the vehicle fenders 12 and 14 with a certain added decorativeness by the use of auxiliary guards 52 and 54. Guards 52 and 54 are secured directly to the bumper members 18 and 20, respectively, as by brackets 56 and 58 welded thereon and by fastening means 60 and 62. The guards 52 and 54 are supported upon the bumper members 18 and 20 and extend the width of bumper protection to take care of impact forces which might otherwise override the bumper members 18 and 20.

The impact member 22 includes depending legs 64 and 66 supporting an intermediate section 68 in bridging parallel spaced relation over the bumper members 18 and 20. The legs 64 and 66 of the impact member 22 are secured to one or the other of the bumper members 18 and 20 directly over the portion thereof secured by bumper strap 24 to the vehicle frame 16. The means of securing the impact member 22 to the bumper members 18 and 20 here includes a bracket 70 disposed behind the bumper member and secured thereto by the bolt means at 40, which also secures the bumper strap 24 to the bumper member. A base template 74, having flanges 75 formed downwardly therefrom, is secured over the top edge of the bumper member by bolt means 76 and 78 which also secure the template to bracket 70 and dispose the template in a manner properly aligning the depending legs 64 and 66 over the bumper members 18 and 20. The template 74 is disposed within the leg of impact member 22, is welded thereto as indicated at 73, and is hidden from normal view. The means of securing the impact member 22 to the bumper members 18 and 20 and the selected location of securement provides a structurally sound impact member braced to receive all impact forces. The impact member 22 will be noted to further act as a guard member to prevent impact forces from overriding the bumper members 18 and 20.

The disposition of the impact member 22 over the inwardly extended and spaced ends of the bumper members 18 and 20 provides an unobstructable and protected area within which may be disposed the vehicle identification or license plate. A license plate holder bracket 77 is formed to include a depending portion 79 having elongated slots 80 and 82 and is stepped as at 84 and there secured to the inner edge of impact member 22 by fastening means 86. The bracket 77 is further formed to include an upstanding portion 88 disposed within the intermediate section 68 of the bridging impact member 22. A light source 90 is secured within the portion 88 of bracket 77 and includes a lead wire 92 which may be passed through body panels 94 and 96 to a source of current. An opening 98 is formed through the lower edge of impact member 22 directly under the light source 90 and centered over the depending portion of the license plate holder bracket 77. An adjustable license plate retainer 100 is secured to body panel 94 between bumper members 18 and 20 and includes a hooked arm 102 extended outwardly to receive and retain the lower edge of the vehicle license plate.

It will be noted that the vehicle license plate will be disposed beneath the bridging impact member 22 and between the bumper members 18 and 20. The license plate is thereby protected from damage by impact forces and is shielded against obstruction as from snow piling up on the bumper structure. At the same time the light source 90 is disposed within the protection of the impact member 22 and is likewise shielded from adverse weather conditions. The light rays emanating from light source 90 are directed through opening 98, which itself is practically unobstructed, to provide adequate illumination of the vehicle license plate.

I claim:

1. A vehicle bumper assembly including bumper members secured to a vehicle frame and extended around adjacent vehicle fenders, said bumper members having ends extended inwardly towards each other in aligned spaced relation, a channeled bridging impact member secured to each of said bumper members near said inwardly extended ends thereof, said bridging impact member being disposed in the plane of said bumper members and thereover to provide a structural support therebetween and in a guard to protect the vehicle body against forces overriding said bumper members.

2. A vehicle bumper assembly including quarter bumpers secured to a vehicle frame and wrapped around adjacent fenders of a vehicle body, said quarter bumpers having adjacent ends thereof disposed in aligned spaced relation across the end of said vehicle body, and an inverted elongated U-shaped impact member supported upon and secured to the face of the adjacent spaced ends of said quarter bumpers and extended therebetween and thereover, said impact member bridging the space between said quarter bumpers for providing protection and access to said vehicle body therebetween.

3. A bumper assembly for vehicles which includes separate bumper members each formed to wrap around the end of a vehicle body, support means for securing said bumper members in fixed spaced relation to the frame of said vehicle and in aligned spaced relation to each other, and a bridging impact member having its ends secured to said bumper members and being extended therebetween and over, said support means including braces having one end secured to said bumper members and the other end secured to said frame with the intermediate portion thereof near said one end secured to said frame and the intermediate portion near said other end secured to said bumper members, said bridging impact member being secured to each of said bumper members over said last mentioned point of securement to derive additional strength and support therefrom and to assure the equalization of impact forces received by said bridging member and transferred to said brace.

4. A vehicle bumper assembly including in combination license plate illuminating means, said bumper assembly comprising quarter bumpers wrapped around the ends of a vehicle body and a bridging impact member having its ends secured to adjacent ends of said quarter bumpers and extended therebetween and over, said illuminating means including a light source mounted within said bridging impact member and an aperture formed through the underside of said impact member, said light source being adapted to provide illumination through said aperture to a license plate mounted upon said vehicle body beneath said bridging impact member and between the adjacent ends of said quarter bumpers.

5. A vehicle bumper including a bumper member formed to partially wrap around a vehicle body, support means for securing said bumper member to the frame of a vehicle and which includes a support strap having one end secured to one end of said bumper member and the other end secured to said frame with the intermediate portion thereof near said one end secured to said frame and the intermediate portion near said other end secured to the other end of said bumper member, and a brace member secured to said frame and to said bumper member intermediate the ends thereof, said support means buttressing said bumper member in fixed spaced relation to said frame and vehicle body.

6. Vehicle bumper support means including bumper straps for securing a bumper member in fixed spaced relation to a vehicle frame, one of said straps having one end adapted to be secured to said bumper member and the other end thereof adapted to be secured to said vehicle frame, said one strap having the intermediate portion thereof near said one end formed to engage and be secured to said frame and the intermediate portion thereof near said other end formed to engage and be secured to said bumper member, and the other of said straps being formed to be secured with said one strap to said frame and to engage and be secured to said bumper member intermediate the points of securement of said one strap thereto.

References Cited in the file of this patent

UNITED STATES PATENTS

| | | |
|---|---|---|
| D. 125,007 | Walker | Feb. 4, 1941 |
| 1,288,292 | Tisman | Dec. 17, 1918 |
| 1,396,628 | Ellis | Nov. 8, 1921 |
| 1,481,964 | Lyon | Jan. 29, 1924 |
| 1,633,603 | Otis | June 28, 1927 |
| 1,637,770 | Fageol | Aug. 2, 1927 |
| 1,666,317 | Tinker | Apr. 17, 1928 |
| 1,674,031 | Burandt | June 19, 1928 |
| 1,695,653 | Heltzel | Dec. 18, 1928 |
| 1,706,806 | Nordgren | Mar. 26, 1929 |
| 1,739,074 | Kauffung | Dec. 10, 1929 |
| 1,897,094 | Wilson | Feb. 14, 1933 |
| 2,009,533 | Tibbetts | July 30, 1935 |
| 2,023,077 | Jandus et al. | Dec. 3, 1935 |
| 2,061,801 | Kamosaki | Nov. 24, 1936 |
| 2,211,820 | Jandus | Aug. 20, 1940 |
| 2,215,509 | Jandus | Sept. 24, 1940 |
| 2,229,505 | Jandus | Jan. 21, 1941 |
| 2,231,313 | Ache | Feb. 11, 1941 |
| 2,667,374 | Signori | Jan. 26, 1954 |
| 2,672,363 | Buchanan | Mar. 16, 1954 |
| 2,807,899 | Adams | Oct. 1, 1957 |

FOREIGN PATENTS

| | | |
|---|---|---|
| 976,863 | France | Mar. 23, 1951 |